United States Patent [19]
Kang

[11] Patent Number: 6,018,258
[45] Date of Patent: Jan. 25, 2000

[54] VARIABLY ADJUSTABLE CLOCK DIVIDER

[75] Inventor: Hun Sik Kang, Daegu-si, Rep. of Korea

[73] Assignee: LG Semicon Co., Ltd., Cheongju, Rep. of Korea

[21] Appl. No.: 09/012,968

[22] Filed: Jan. 26, 1998

[30] Foreign Application Priority Data

Feb. 3, 1997 [KR] Rep. of Korea ......................... 97-3295

[51] Int. Cl.[7] ................................................... H03K 21/00

[52] U.S. Cl. ............................................ 327/115; 327/117

[58] Field of Search ................................... 327/115, 117, 327/118; 377/47, 48

[56] References Cited

U.S. PATENT DOCUMENTS

| 5,714,896 | 2/1998 | Nakagawa et al. | 327/117 |
| 5,822,229 | 10/1998 | Steinebach | 377/47 |
| 6,614,869 | 3/1997 | Bland | 377/48 |

FOREIGN PATENT DOCUMENTS

4-160818  6/1992  Japan ........................ 377/47

*Primary Examiner*—Kenneth B. Wells
*Attorney, Agent, or Firm*—Fleshner & Kim

[57] ABSTRACT

A clock divider of a preferred embodiment generates an output clock signal having one of even and odd number of clock cycles of an input clock signal. The output clock signal has a duty cycle of about 50%. In a preferred embodiment, the clock divider includes a divisor circuit, a control circuit and an output circuit.

30 Claims, 9 Drawing Sheets

VARIABLY ADJUSTABLE CLOCK DIVIDER

BACKGROUND OF THE INVENTION

1. Field of the Invention

The present invention relates to a divider, and more particularly, to a clock divider.

2. Background of the Related Art

Figure 1:
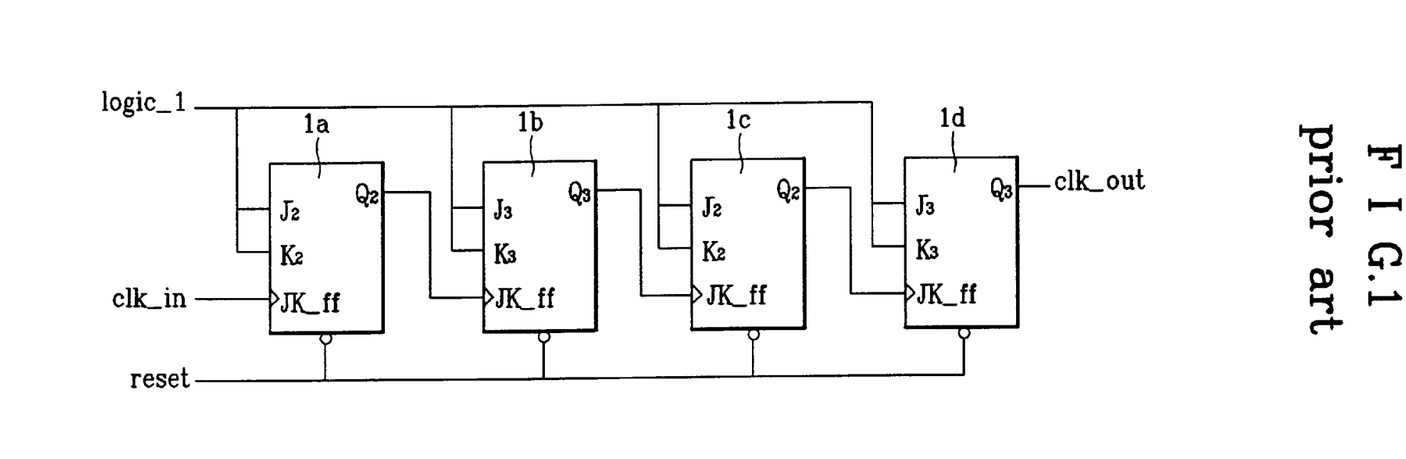
FIG. 1 is a schematic of a prior art clock divider.
Figure 2:
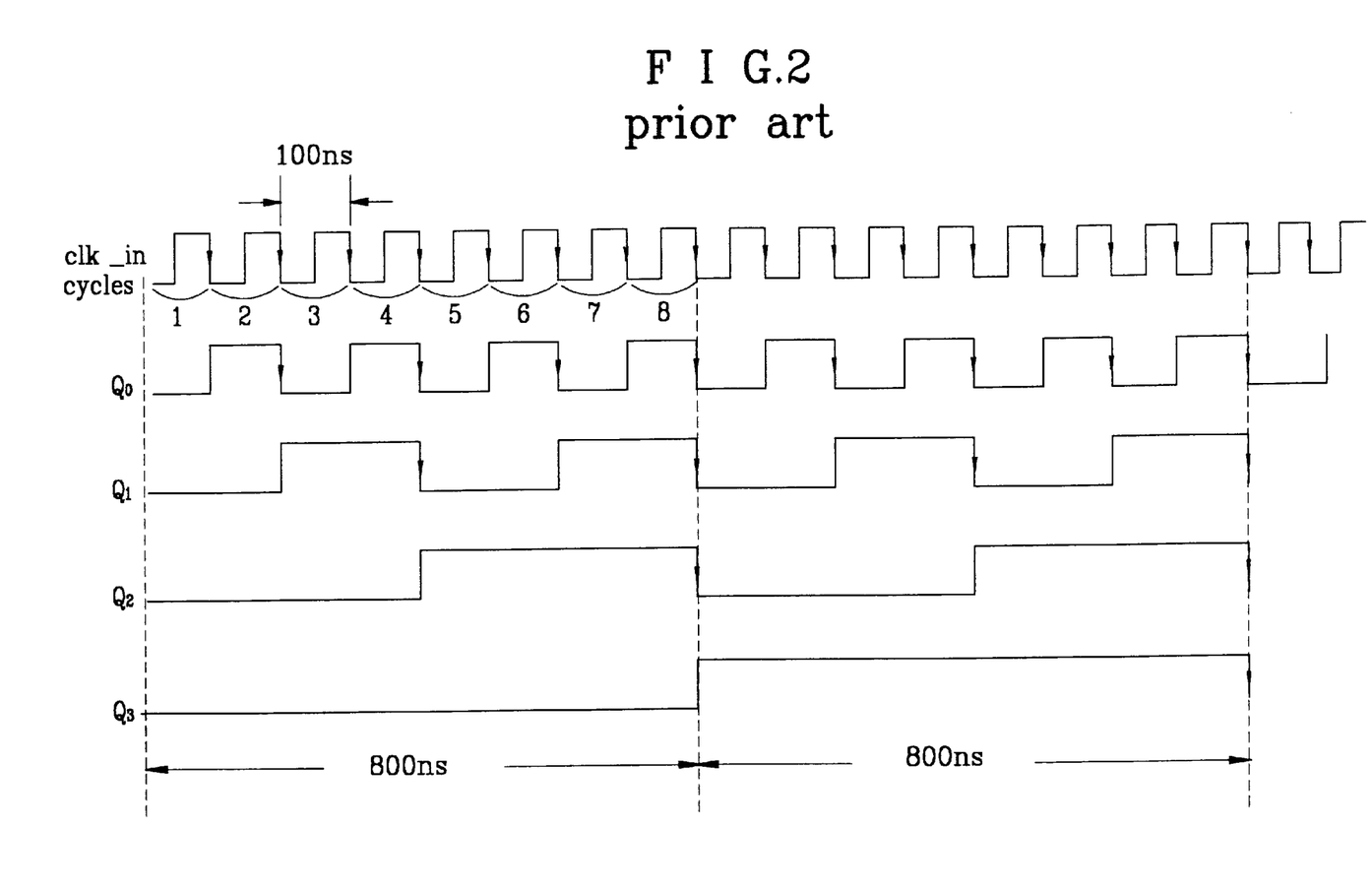
FIG. 2 are operational waveforms of a clock divider illustrated in FIG. 1.

FIG. 1 is a configuration block of a conventional clock divider using a ripple carry counter. FIG. 2 shows operational waveforms of a conventional clock divider using a ripple carry counter. As shown, the transition of output values from respective flip-flops 1a, 1b, 1c and 1d occurs at negative edges of input clock signals clk-in. The output values of the respective flip-flops 1a, 1b and 1c are respectively provided to an adjacent flip-flop.

A clock divider using an MOD-N counter has an output value "0" for a prescribed number of input clock cycles and then has an output value "1" for the prescribed number of input clock cycles. For example, if the input clock signal has a clock period of 100 ns (frequency of 10 MHZ) and an output clock signal having a period of 1600 ns is desired, the clock divider has an output value "0" for eight (8) complete cycles of the input clock signal and has an output value of "1" for the next eight (8) complete cycles of the input clock signal. The MOD-N counter is a ripple counter having the number of states N. In the case that the ripple counter includes M number flip-flops M, the relationship between the flip-flops and the number N can be expressed as $N=2^M$.

Since the conventional clock divider as aforementioned generates clocks having an even number of cycles from reference clocks (input clocks), it is difficult to generate an output clock signal having an odd number of cycles of the input clock signal. In addition, the conventional clock divider fails to realize a duty cycle of about 50% or less to generate the output clock signals having an odd number of cycles even if it is possible to do so. For this reason, the conventional clock divider has a problem that it is not suitable for systems which require clocks of different odd number of cycles or periods with a duty cycle of about 50%.

SUMMARY OF THE INVENTION

Accordingly, the present invention substantially obviates one or more of the problems of the related art.

An object of the present invention is to generate output clock signals of different periods.

An object of the present invention is to generate an output clock signal having a period equal to a multiple of an input clock signal period.

Another object is to provide an output clock signal having a period equal to an odd multiple of an input clock signal.

A further object is to provide an output clock signal having a duty cycle of about 50%

To achieve these and other advantages and in accordance with the purpose of the present invention, as embodied and broadly described, a clock divider according to the present invention includes: an odd number period signal outputting portion for receiving an input clock and outputting divisors which are necessary to generate an output clock having a desired odd number period; a clock divide controller for outputting a control signal required for clock distribution by counting and comparing clock signals having an odd number period with each other; and a clock divide signal outputting portion for outputting the clock signals distributed at an odd number period by the control signal from the clock divide controller.

The invention can be achieved in whole or in parts by a clock divider comprising: (a) a divisor circuit coupled for receiving a first clock signal having a first prescribed period and responsive to an input divisor value (DIV) and a plurality of control signals, the divisor circuit generating an output signal indicative of the input divisor value; and (b) a control circuit coupled to the divisor circuit for receiving the output signal such that the control signal generates a second clock signal having a first logic state for a first prescribed length of time and a second state for a second prescribed length of time, wherein the second clock signal has a second prescribed period substantially equal to the input divisor value times the first prescribed period of the first clock signal.

The invention can be also achieved in a whole or in parts by a method of generating an output clock signal having an output period equal to an input divisor times an input period of an input clock signal, the method comprising the steps of: generating first and second divisors, where the input divisor equals the first divisor plus the second divisor; generating an intermediate clock signal having an intermediate period equal to a sum of first and second prescribed periods of time, where the first prescribed period equals the first divisor times the input period and the second prescribed period equals the second divisor times the input period; and adjusting a transition of the intermediate clock signal from a first state to a second state for outputting the output clock signal having a duty cycle of substantially 50 percent.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
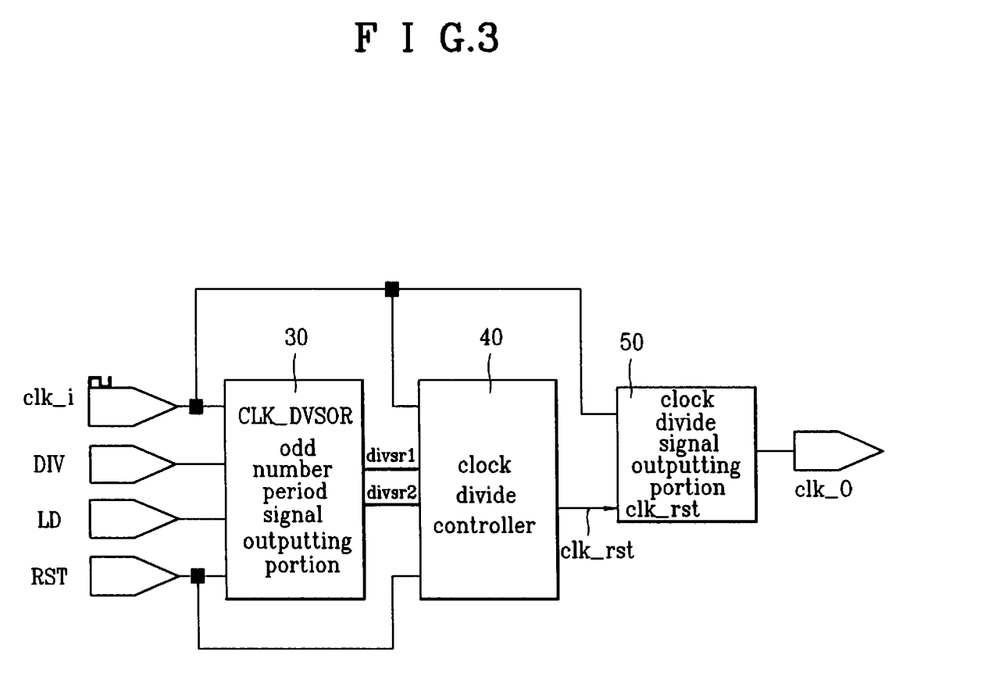
FIG. 3 is a block diagram of a clock divider in accordance with one of the preferred embodiments.

FIG. 3 is a block diagram of a clock divider 20 in accordance with one of the preferred embodiments. The clock divider 20 includes a divisor circuit 30, a control circuit 40 and an output circuit 50.

The divisor circuit 30 generates a first divisor value divsr1 and a second divisor value divsr2 of (N−1) bits based on an input divisor value DIV of N-bits, where DIV=divsr1+divsr2 and DIV=frequency of the input clock signal fi÷frequency of the output clock signal fo, in response to a plurality of control signals, e.g., an input clock signal clk_i having an input clock period of τ1, a load signal LD, and a reset signal RST.

The control circuit 40 is coupled to the divisor circuit 30 for receiving the first and second divisor values divsr1 and divsr2. The control circuit 40 generates an intermediate clock signal clk_rst having a first state, e.g., "0" logic state, for a first prescribed length of time T1, where T1=divsr1×τ1=divsr1 number of input clock cycles, and a second state, e.g., "1" logic state, for a second prescribed length of time T2, where T2=divsr2×τ1=divsr2 number of input clock cycles in response to input clock signal clk_i and a reset signal RST. Accordingly, the intermediate clock signal has a period τ2 of T1+T2.

The output circuit 50 is coupled to the control circuit 40 for receiving the intermediate clock signal clk_rst. The output circuit 50 generates an output clock signal clk_o having a period τ3=DIV×period τ1=DIV number of input clock cycles.

Figure 4A:
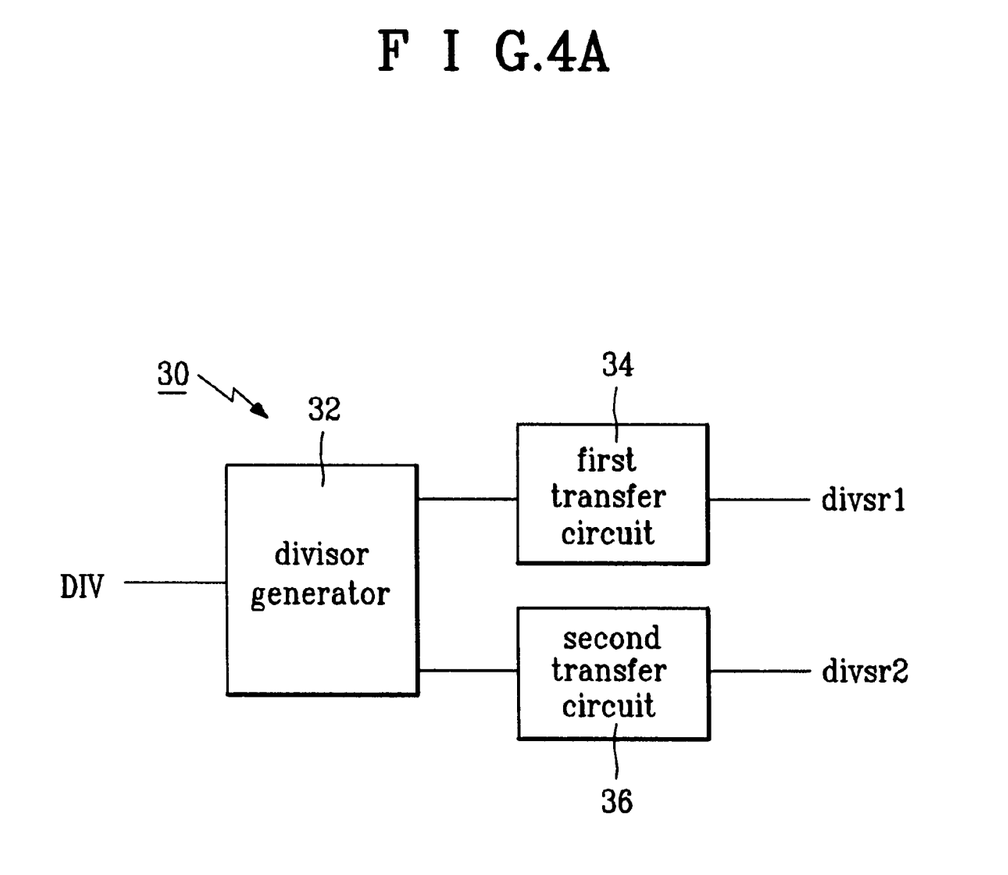
FIG. 4A is a block diagram of a divisor circuit illustrated in FIG. 3.

FIG. 4A is a block diagram of a divisor circuit 30 of FIG. 3. The divisor generator unit 32 receives the input divisor value DIV of N-bits to generate the first and second divisors divsr1 and divsr2, which are provided to first and second transfer circuits 34 and 36, respectively. The first and second transfer circuits 34 and 36 are coupled to receive the load signal LD, the input clock signal clk_i and the reset signal RST. The first and second transfer circuits 34 and 36 output the first and second divisors divsr1 and divsr2, respectively, in synchronization with the input clock signal clk_i.

Figure 4B:
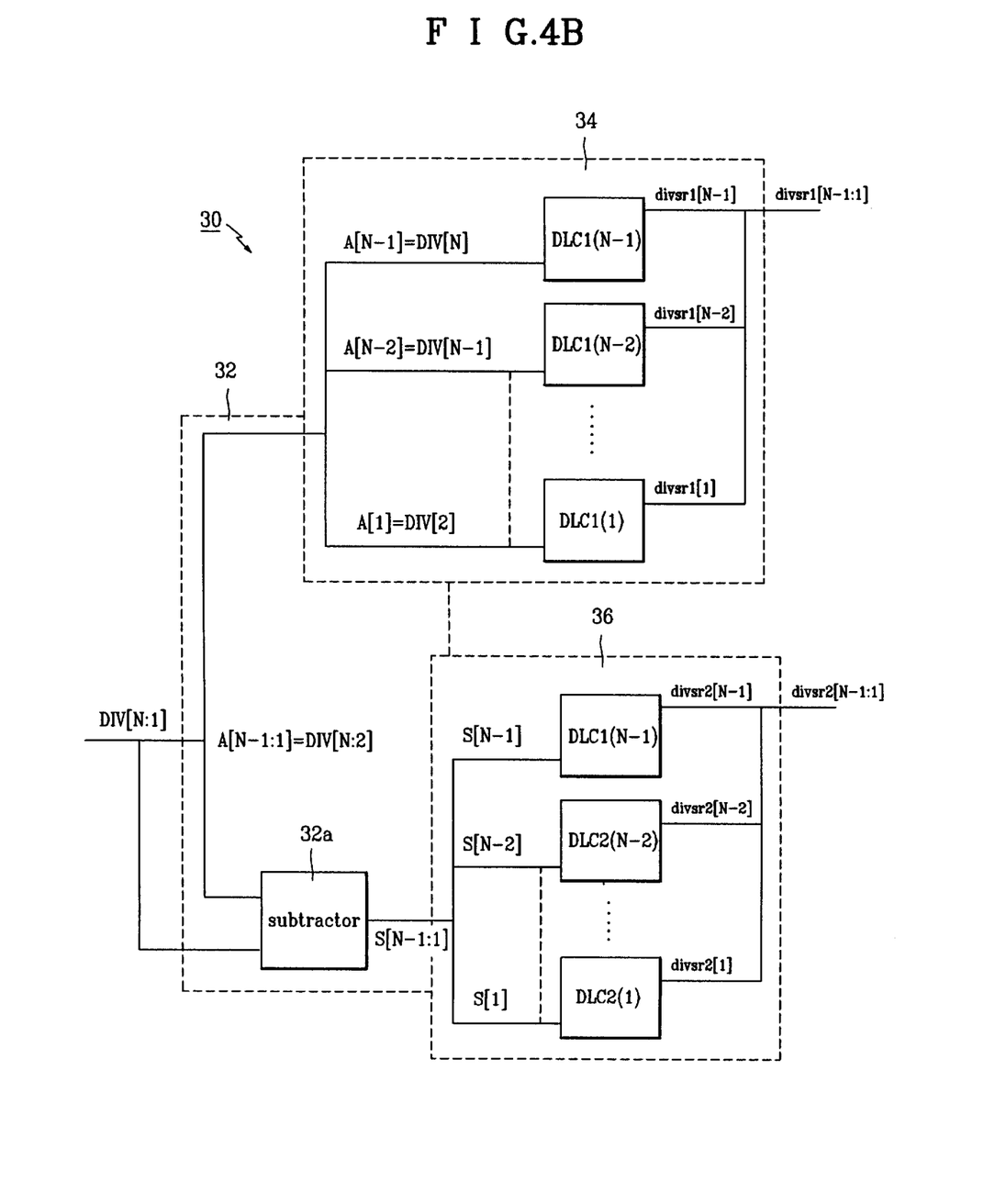
FIG. 4B is a detailed schematic of the divisor circuit illustrated in FIG. 4A.

FIG. 4B is a detailed schematic of the divisor circuit of FIG. 4A. The input divisor value is provided on a N-bit bus lines DIV[N:1]. The divisor generator 32 includes a bit shift arrangement to accomplished, for example, a right shift by connecting bus lines A[N−1:1] of N−1 bits to bus lines DIV[N:2]. In other words, the most significant bit line A[N−1] of bus lines A[N−1:1] is coupled to the most significant bit line DIV[N] of bus lines DIV[N:1] while the least significant bit line A[1] of the bus lines A[N−1:1] is coupled to the second least significant bit line DIV[2] of the bus lines DIV[N:1]with intermediate bus lines being correspondingly coupled to each other. Hence, A[N−1:1]=DIV[N:2]. Such a bit shift arrangement of the bus lines provides a first divisor binary bits divsr1<N−1:1>on the bus line A[N−1:1] such that divsr1=truncated number of (DIV÷2). In an alternative embodiment, a shifter can achieve the bit shifting function.

A subtractor 32a is coupled to the bus lines A[N−1:1] and DIV[N:1]. The subtractor performs a subtraction between the binary bits A<N−1> and DIV<N:1>such that the decimal value of the second divisor divsr2=DIV-divsr1. The second divisor binary bits divsr2<N−1:1>are provided on the bus lines S[N−1:1].

The first transfer circuit 34 includes a plurality of first divisor loader cells DLC1(N−1) to DLC1(1), each coupled to a corresponding bit line A[N−1], A[N−2], . . . , A[1]. The second transfer circuit 36 includes a plurality of second divisor loader cells DLC2(N−1) to DLC2(1), each coupled to a corresponding bit line S[N−1], S[N−2], . . . , S[1].

Each of the first loader cells DLC1(N−1) to DLC1(1) provides a corresponding bit of the first divisor binary bits divsr1<N−1:1>onto a corresponding bit line divsr1[N−1], divsr1[N−2], . . . , divsr1[1] for providing the first divisor binary bits divsr1<N−1:1>onto the bus lines divsr1[N−1:1]. Each of the second loader cells DLC2(N−1) to DLC2(1) provides a corresponding bit of the second divisor binary bits divsr2<N−1:1>onto a corresponding bit line divsr2[N−1], divsr2[N−2], . . . , divsr2[1] for providing the second divisor binary bits divsr2<N−1:1>onto the bus lines divsr2[N−1:1].

Figure 4C:
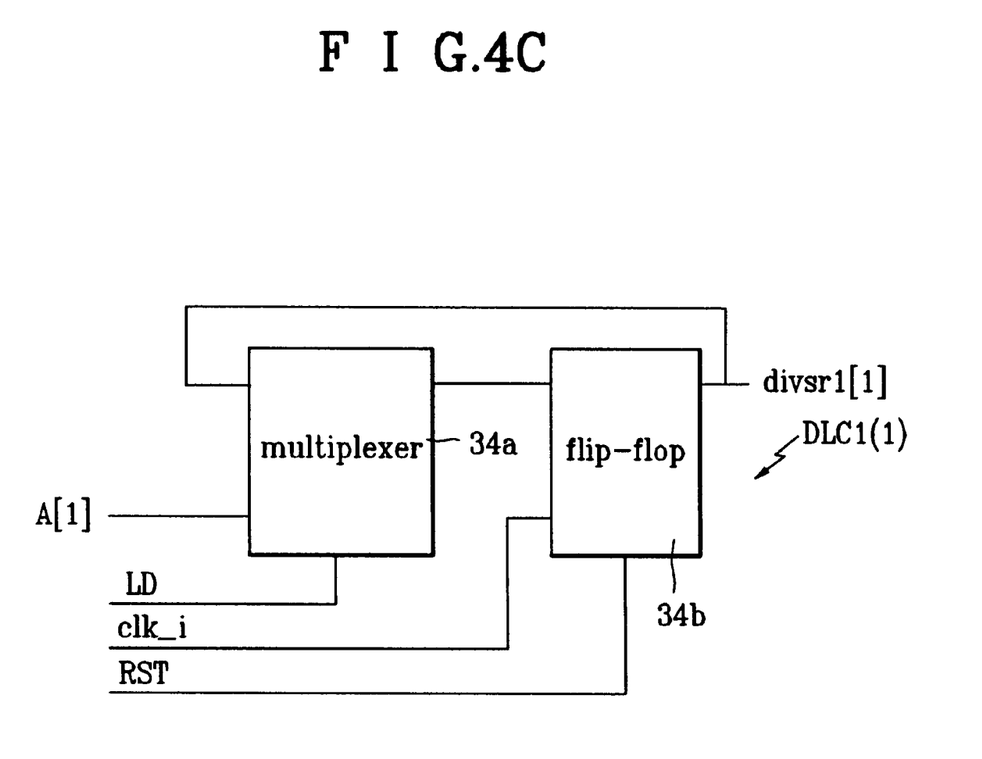
FIG. 4C is a detailed schematic of a divisor loader cell illustrated in FIG. 4B.

FIG. 4C is a detailed schematic of the first divisor loader cell DLC1(1), which exemplify the first and second divisor loader cells DLC1(N−1) to DLC1(2) and DLC2(N−1) to DLC2(1) in the preferred embodiment. The first loader cell DLC(1) includes a multiplexer 34a and a flip-flop 34b. The bit line A[1] and a feed back of bit line divsr[1] are provided to the multiplexer 34a, and the multiplexer 34a is responsive to the load signal LD. The output of the multiplexer 34a is coupled to the input of the flip-flop 34b, which is responsive to the input clock signal clk_i and the reset signal RST to provide the first divisor binary bit divsr1<1 >onto the bit line divsr[1]. The first and second loader cells DLC1(N−1) to DLC1(1) and DLC2(N−1) to DLC2(1) are responsive to the reset signal RST for resetting the values stored in the first and second loader cells to a logic state of "0" and outputs the first and second divisor binary bits divsr1<N−1:1> and divsr2<N−1:1>synchronous with the input clock signal clk_i in response to the load signal LD.

Figure 5A:
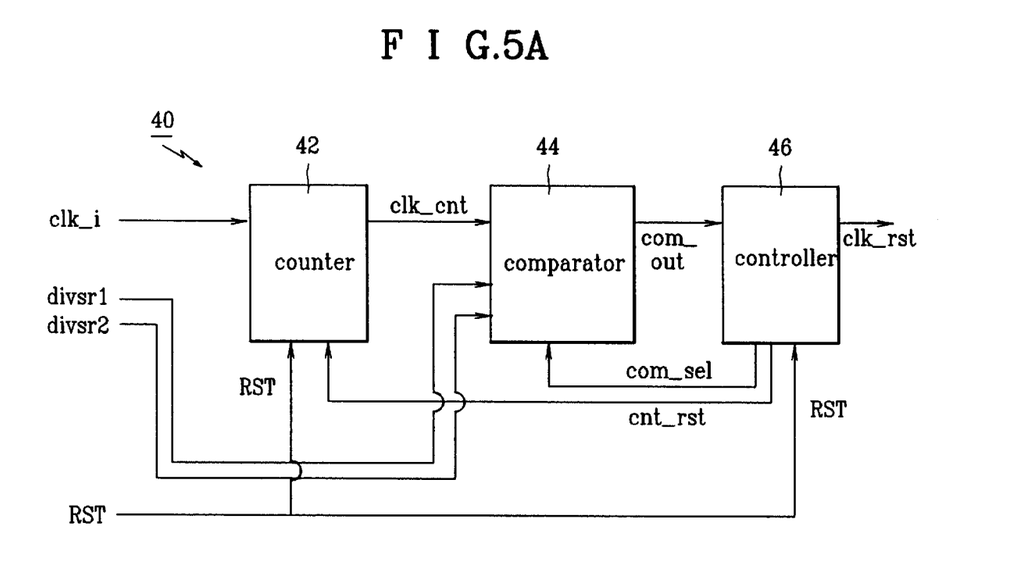
FIG. 5A is a detailed schematic of a control circuit 40 illustrated in FIG. 3.

FIG. 5A illustrates the details of the control circuit 40, which includes a counter 42, a comparator 44 and a controller 46, to generate the intermediate clock signal clk_rst. The counter 42 is coupled to the reset signal RST and the input clock signal clk_i. The counter 42 counts the number of cycles of the input clock signal and outputs a clock count value clk_cnt. The comparator 44 receives the first and second divisor binary bits divsr1<N−1:1> and divsr2<N−1:1>on bus lines divsr1[N−1:1] and divsr2[N−1:1] an clock count value clk_cnt from the counter 42, and the comparator 44 outputs a comparative output com_out. The controller 46 receives the reset signal RST and the comparative output com_out to generate the intermediate clock signal clk_rst, a comparative selection signal com_sel and a counter reset signal cnt_rst.

Figure 5B:
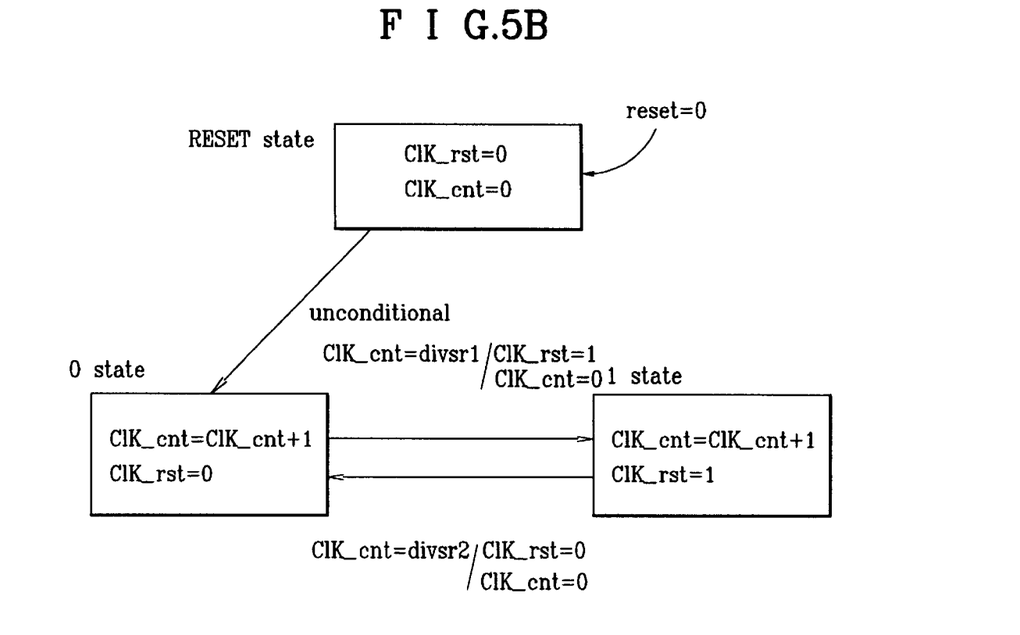
FIG. 5B is a state diagram illustrating a preferred operation of a control circuit 40 illustrated in FIG. 5A.

FIG. 5B is a state diagram illustrating a preferred operation of the control circuit 40. The reset signal RST is inputted to reset the counter 42 and the controller 46 and the counter 42 initiates the counting the number of cycles of the input clock signal clk_i to output the clock count value clk_cnt to the comparator 44 (RESET state). The controller 46 unconditionally generates the first state, e.g., "0" logic state, of the intermediate clock signal and generate the counter reset signal cnt_rst to reset the clock count value clk_cnt to zero.

The comparator 44 compares the clock count value clk_cnt with the first divisor divsr1. The controller 46 generates the comparative output com_out indicating whether the clock count value clk_cnt equals the first divisor divsr1. The controller 46 continually generates the first state of the intermediate clock signal clk_rst when the comparative output com_out indicates that the clock count signal clk_cnt does not equal the first divisor divsr1. See "0" state, clk_cnt=clk_cnt+1; and clk_rst=0.

When the comparative output com_out indicates that the clock count signal clk_cnt equals the first divisor divsr1, the controller 46 generates the count reset signal to reset the counter to "zero" (clk_cnt=divsr1/clk_rst=1;clk_cnt=0). The controller 46 generates the comparative select signal com_sel to the comparator 44 indicating the comparison of the clock count signal clk_cnt to the second divisor divsr2. The controller 46 outputs the second state, e.g., "1" state, of the intermediate clock signal clk_rst. The controller 46 continually generates the second state of the intermediate clock signal clk_rst when the comparative output com_out indicates that the clock count signal clk_cnt does not equal the second divisor divsr2. See "1" state, clk_cnt=clk_cnt+1, clk_rst=1.

When the comparative output com_out indicates that the clock count signal clk_cnt equals the second divisor divsr2, the controller 46 generates the count reset signal to reset the counter 42 to "zero" (clk_cnt=divsr2/clk_rst=0;clk_cnt=0). The process is subsequently repeated between the "0" state and the "1" state such that the control circuit 40 generates an intermediate clock signal clk_rst having a first state, e.g., "0" state, for a first prescribed length of time T1, where T1=divsr1×τ1=divsr1 number of input clock cycles, and a second state, e.g., "1" state, for a second prescribed length of time T2, where T2=divsr2×τ1=divsr2 number of input clock cycles, in response to input clock signal clk_i and a reset signal RST.

Figure 6:
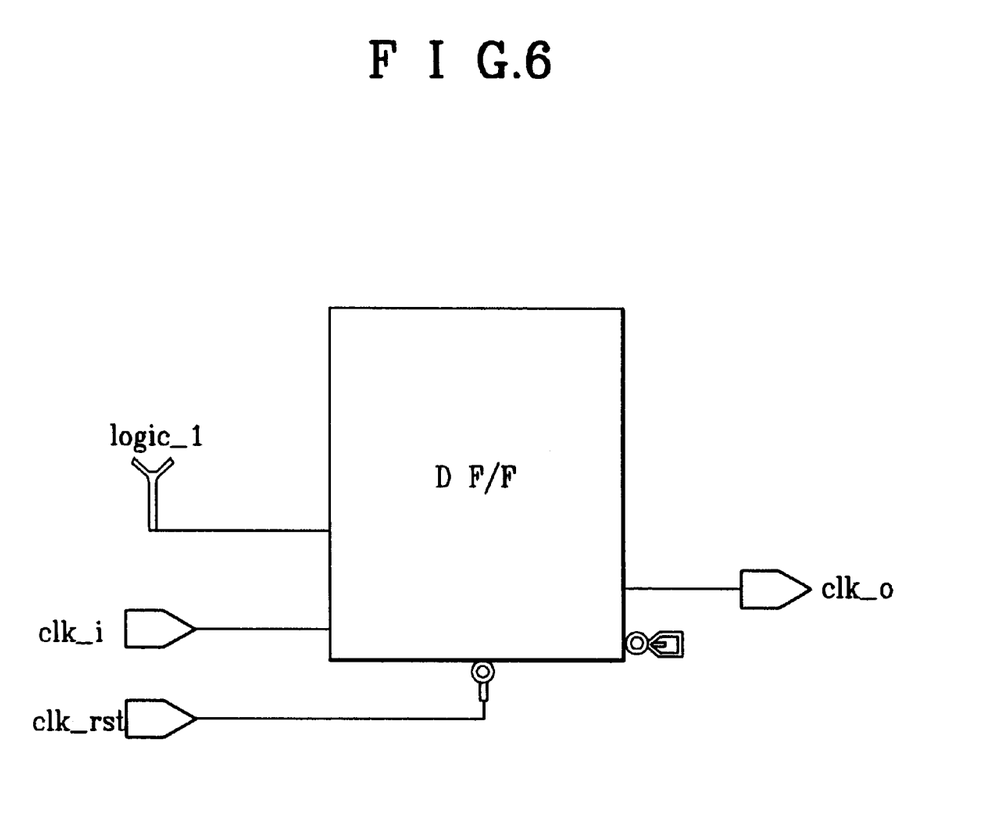
FIG. 6 illustrates details of an output circuit illustrated in FIG. 3.

FIG. 6 illustrates the details of the output circuit 50 having a flip-flop 52, preferably a D flip-flop in the preferred embodiment. The flip-flop 52 is coupled to a voltage source Vcc, the input clock signal clk_i and the intermediate clock signal clk_rst. The output circuit is responsive to the input clock signal clk_i and the intermediate clock signal clk_rst to generate the output clock signal clk_o having the desired period τ2.

The flip-flop 52 adjusts the transition of the output clock signal clk_o from the first state, e.g., 0 state, to the second state, e.g., 1 state, to occur after the transition of the intermediate clock signal clk_rst from the first state to the second state during a subsequent transition of the input clock signal clk_i from the first state to the second state. The output clock signal clk_o transits from the second state to the first state concurrently with the transition of the intermediate clock signal clk_rst from the second state to the first state.

Figure 7:
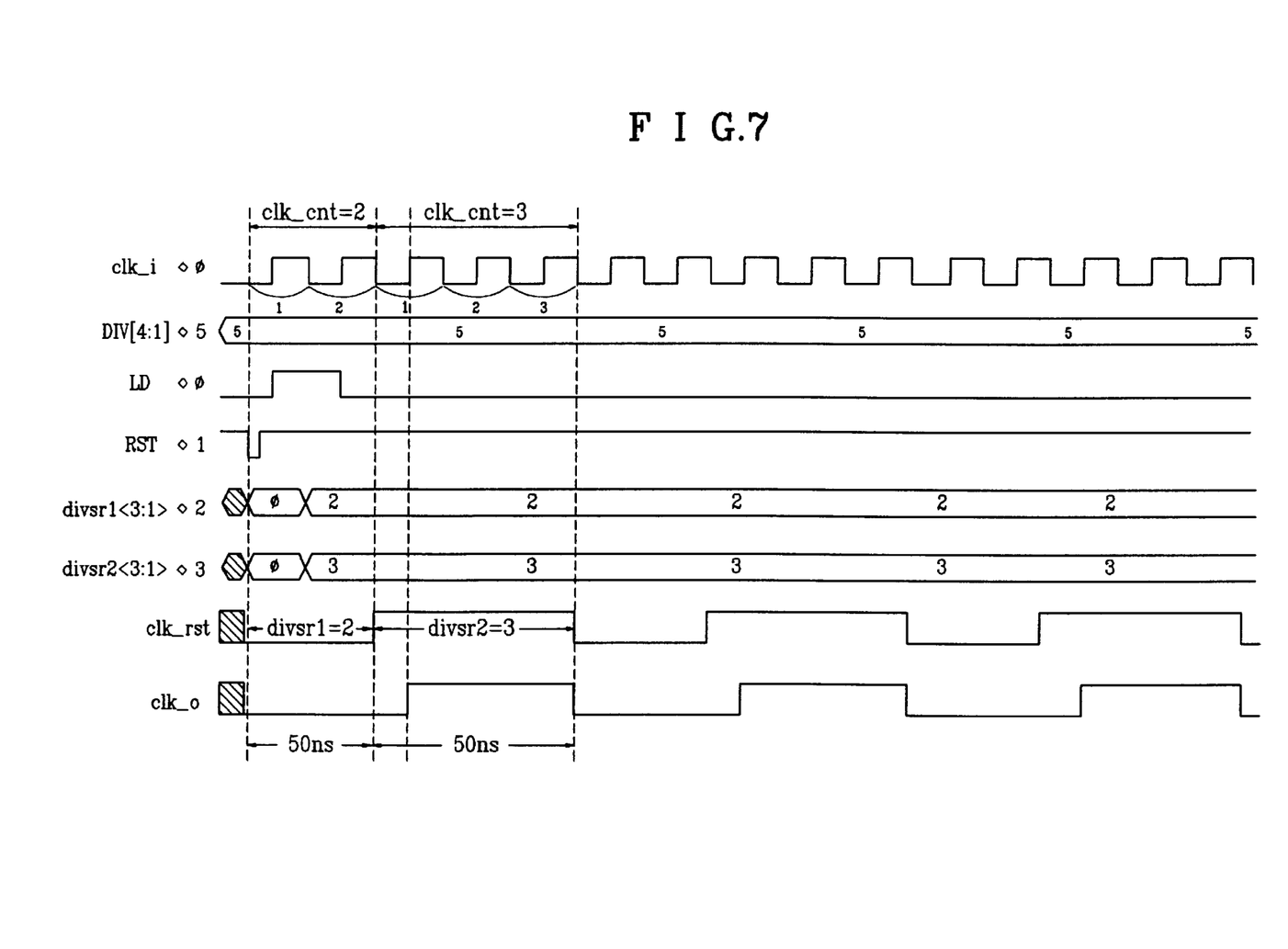
FIG. 7 is a waveform of a clock divider in accordance with the preferred embodiment when an output clock signal clk_o having an output frequency of 10 MHz (τ2=100 ns) based on an exemplary input clock signal clk_i having a frequency of 50 MHz (τ1=20 ns).

FIG. 7 is a waveform of the clock divider when an output clock signal clk_o having an output frequency fo of 10 MHz (τ2=100 ns) based on an exemplary input clock signal clk_i having an input frequency fi of 50 MHz (τ1=20 ns). Based on the equations discussed,

| Decimal value | | Binary value | Bus lines |
|---|---|---|---|
| DIV = fi/fo = 50/10 = 5 | | DIV<0,1,0,1> | DIV[4:1] |
| divsr1 | = truncated number of (DIV ÷ 2) | divsr1<0,1,0> | A[3:1] |
| | = truncated number of (5 ÷ 2) = 2 | | divsr1[3:1] |
| divsr2 | = DIV − divsr1 = 3 | divsr2<0,1,1> | S[3:1] divsr2[3:1] |

As described above, the bit shift arrangement accomplished by the bus line connections between bus lines DIV[4:2] and A[3:1] for the first divisor binary bits divsr1<0,1,0>. The subtractor provides the result of the second divisor binary bits divsr2<0,1,1>onto the bus lines S[3:1]. The first and second loader cells output the first and second divisor bits divsr1<0,1,0>and divsr2<0,1,1>in synchronization with the input clock signal clk_i.

The reset signal RST is inputted to reset the counter 42 and the controller 46, and the counter 42 initiates the counting the number of cycles of the input clock signal clk_i to output the clock count value clk_cnt to the comparator 44. The controller 46 unconditionally generates the "0" state of the intermediate clock signal and generates the counter reset signal cnt rst to reset the clock count value clk_cnt to zero.

The comparator 44 compares the clock count value clk_cnt with the first divisor divsr1 (=2). The controller 46 generates the comparative output com_out indicating whether the clock count value clk_cnt equals the first divisor divsr1. The controller 46 continually generates the "0" state of the intermediate clock signal clk_rst when the comparative output com_out indicates that the clock count signal clk_cnt does not equal the first divisor divsr1. When the comparative output com_out indicates that the clock count signal clk_cnt=first divisor divsr1=2, the controller 46 generates the count reset signal to reset the counter to "zero". Accordingly, the control circuit 40 generates an intermediate clock signal clk_rst having a first state of the first prescribed length of time T1=divsr1×τ1=40 ns=2 cycles of the input clock signal clk_i.

The controller 46 generates the comparative select signal com_sel to the comparator 44 indicating comparison of the clock count signal clk_cnt to the second divisor divsr2 (=3). The controller 46 outputs the "1" state, of the intermediate clock signal clk_rst. The controller 46 continually generates the second state of the intermediate clock signal clk_rst when the comparative output com_out indicates that the clock count signal clk_cnt does not equal the second divisor divsr2. When the comparative output com_out indicates that the clock count signal clk_cnt equals the second divisor divsr2, the controller 46 generates the count reset signal to reset the counter 42 to "zero". Accordingly, the control circuit 40 generates an intermediate clock signal clk_rst having a second state of the second prescribed length of time T2=divsr×τ2=60 ns=3 cycles of the input clock signal clk_i.

The output circuit 50 is responsive to the input clock signal clk_i and the intermediate clock signal clk_rst to generate the output clock signal clk_o having the desired period τ2. The flip-flop 52 adjusts the transition of the output clock signal clk_o from the "0" state to the "1" state to occur at the positive-edge transition of the input clock signal clk_i. The output clock signal clk_o transits from the "1" state to the "0" state concurrently at a negative-edge transition of the intermediate clock signal clk_rst Accordingly, the output clock signal has a period τ2 of 100 ns with a duty cycle of about 50 %.

The foregoing embodiments are merely exemplary and are not to be construed as limiting the present invention. The present teaching can be readily applied to other types of apparatuses. The description of the present invention is intended to be illustrative, and not to limit the scope of the claims. For example, the preferred embodiment may be applied to even number of clock cycles. Many alternatives, modifications, and variations will be apparent to those skilled in the art.

What is claimed is:

1. A clock divider comprising:

(a) a divisor circuit coupled for receiving a first clock signal having a first prescribed period and responsive to an input divisor value (DIV) and a plurality of control signals, said divisor circuit generating an output signal indicative of the input divisor value;

(b) a control circuit coupled to said divisor circuit for receiving the output signal such that said control circuit generates a second clock signal having a first logic state for a first prescribed length of time and a second state for a second prescribed length of time, wherein the second clock signal has a second prescribed period substantially equal to the input divisor value times the first prescribed period of the first clock signal; and an output circuit coupled to said control circuit, said output circuit adjusting a transition of the second clock signal from the first state to the second state and outputting a third clock signal.

2. The clock divider of claim 1, wherein said divisor circuit comprises:

a divisor generator that receives the input divisor value and generates a first divisor (divsr1) and a second divisor (divsr2) based on the input divisor value;

a first transfer circuit that receives the first divisor; and a second transfer circuit that receives the second divisor, wherein said first and second transfer circuits output the first and second divisors, respectively, as the output signal of said divisor circuit.

3. The clock divider of claim 2, wherein DIV=divsr1+divsr2.

4. The clock divider of claim 2, wherein said divisor generator comprises:

means for generating the first divisor based on a truncation of DIV/2; and a subtractor that subtracts the first divisor from the input divisor value to generate the second divisor.

5. The clock divider of claim 4, wherein said first divisor generating means comprises means for right-bit shifting binary bits representing the input divisor value.

6. The clock divider of claim 5, wherein said right-bit shifting means comprises a bus connection between an N-bit input bus receiving the input divisor value and an N−1 bit bus, wherein a least significant bit of the N−1 bit bus is coupled to a second least significant bit of the N bit input bus.

7. The clock divider of claim 2, wherein first and second divisor have different values.

8. The clock divider of claim 1, wherein the third clock signal has a duty cycle of substantially 50 percent.

9. The clock divider of claim 2, wherein said first transfer circuit comprises a plurality of first loader cells and said second transfer circuit comprises a plurality of second loader cells, each of said first and second loader cells receiving a corresponding bit representative of the first and second divisors from said divisor generator.

10. The clock divider of claim 9, wherein said first and second loader cells being responsive to the control signals to reset values stored therein, and outputting said first and second divisors in synchronization with the first clock signal.

11. The clock divider of claim 9, wherein each of said first and second loader cells comprises:

a multiplexer coupled to receive the corresponding bit; and a flip-flop coupled to receive an output of said multiplexer, an output of said flip-flop being feed back to an input of said multiplexer, and said multiplexer and flip-flop being responsive to the control signals.

12. The clock divider of claim 1, wherein said divisor circuit generates a first divisor and a second divisor based on the input divisor value, and the first prescribed length of time equals the first divisor times the first prescribed period and the second prescribed length of time equals the second divisor times the first prescribed period.

13. The clock divider of claim 12, wherein said control circuit comprises:

a counter coupled to receive the first clock signal, said counter counting a number of first cycles to output a count value;

a comparator coupled to receive said first and second divisors and said clock count value and to output a comparative output; and a controller coupled to receive the comparative output, said controller generating the second clock signal, a comparative selection signal and a counter reset signal.

14. The clock divider of claim 13, wherein said counter initiates a counting of the first clock cycles to output the count value to said comparator in response to one of the control signals, said controller generating the first state of the second clock signal and generating the counter reset signal to reset the count value to zero and said controller generating the comparative output indicating whether the count value equals the first divisor.

15. The clock divider of claim 14, wherein said controller continually generates the first state of the second clock signal until the comparative output indicates that the count value equals the first divisor, and in response, said controller generating the count reset signal to reset the counter to "zero", generating the comparative select signal indicating comparison of the count value to the second divisor and outputting the second state of the second clock signal.

16. The clock divider of claim 1, said output circuit is responsive to the first clock signal and the second clock signal to generate the third clock having a third prescribed period equal to the input divisor value time the first prescribed period, said output circuit comprising a flip-flop which adjusts the transition of the third clock signal from the first state to the second state after the transition of the second clock signal from the first state to the second state during a subsequent transition of the first clock signal from the first state to the second state.

17. The clock divider of claim 1, wherein ½ of a period of the third clock signal equals an odd number of cycles of the first clock signal.

18. The clock divider of claim 1, wherein the input divisor value is a value greater than 1.

19. The clock divider of claim 18, wherein the input divisor value is an integer.

20. A method of generating an output clock signal having an output period equal to an input divisor times an input period of an input clock signal, the method comprising the steps of:

generating first and second divisors, where the input divisor equals the first divisor plus the second divisor;

generating an intermediate clock signal having an intermediate period equal to a sum of first and second prescribed periods of time, where the first prescribed period equals the first divisor times the input period and the second prescribed period equals the second divisor times the input period; and adjusting a transition of the intermediate clock signal from a first state to a second state for outputting the output clock signal having a duty cycle of substantially 50 percent.

21. The method of claim 20, wherein ½ of the output period equal an odd number of cycles of the clock signal.

22. The method of claim 20, wherein the input divisor is a value greater than 1.

23. The method of claim 22, wherein the input divisor is an integer.

24. The method of claim 20, wherein the input divisor equals the first divisor plus the second divisor.

25. A clock divider comprising:
(a) a divisor circuit coupled for receiving a first clock signal having a first prescribed period and responsive to an input divisor value (DIV) and a plurality of control signals, said divisor circuit generating an output signal indicative of the input divisor value; and
(b) a control circuit coupled to said divisor circuit for receiving the output signal such that said control signal generates a second clock signal having a first logic state for a first prescribed length of time and a second state for a second prescribed length of time, wherein the second clock signal has a second prescribed period substantially equal to the input divisor value times the first prescribed period of the first clock signal, wherein said divisor circuit comprises:
   a divisor generator that receives the input divisor value and generates a first divisor (divsr1) and a second divisor (divsr2) based on the input divisor value;
   a first transfer circuit that receives the first divisor; and
   a second transfer circuit that receives the second divisor, wherein
      said first and second transfer circuits output the first and second divisors, respectively, as the output signal of said divisor circuit.

26. The clock divider of claim 25, wherein DIV=divsr1+divsr2.

27. The clock divider of claim 25, wherein the input divisor value is an integer greater than 1.

28. A clock divider comprising:
(a) a divisor circuit coupled for receiving a first clock signal having a first prescribed period and responsive to an input divisor value (DIV) and a plurality of control signals, said divisor circuit generating an output signal indicative of the input divisor value; and
(b) a control circuit coupled to said divisor circuit for receiving the output signal such that said control signal generates a second clock signal having a first logic state for a first prescribed length of time and a second state for a second prescribed length of time, wherein the second clock signal has a second prescribed period substantially equal to the input divisor value times the first prescribed period of the first clock signal, wherein said divisor circuit generates a first divisor and a second divisor based on the input divisor value, and the first prescribed length of time equals the first divisor times the first prescribed period and the second prescribed length of time equals the second divisor times the first prescribed period.

29. The clock divider of claim 28, wherein the input divisor value equals the first divisor plus the second divisor.

30. The clock divider of claim 28, wherein the input divisor value is an integer greater than 1.

* * * * *